US012392461B2

(12) United States Patent
He

(10) Patent No.: US 12,392,461 B2
(45) Date of Patent: Aug. 19, 2025

(54) LED LAMP MANUFACTURED THROUGH INJECTION PROCESS

(71) Applicant: Shangyou Jiayi Lighting Product Co., LTD., Jiangxi (CN)

(72) Inventor: Yaowen He, Jiangxi (CN)

(73) Assignee: Shangyou Jiayi Lighting Product Co., LTD., Ganzhou (CN)

( * ) Notice: Subject to any disclaimer, the term of this patent is extended or adjusted under 35 U.S.C. 154(b) by 0 days.

(21) Appl. No.: 18/584,872

(22) Filed: Feb. 22, 2024

(65) Prior Publication Data

US 2024/0288150 A1 Aug. 29, 2024

(51) Int. Cl.

| | |
|---|---|
| ***F21S 4/10*** | (2016.01) |
| ***F21V 15/01*** | (2006.01) |
| ***F21V 17/16*** | (2006.01) |
| ***F21V 19/00*** | (2006.01) |
| ***F21V 23/00*** | (2015.01) |
| ***F21Y 115/10*** | (2016.01) |

(52) U.S. Cl.

CPC .............. *F21S 4/10* (2016.01); *F21V 15/013* (2013.01); *F21V 17/164* (2013.01); *F21V 19/0025* (2013.01); *F21V 23/001* (2013.01); *F21Y 2115/10* (2016.08)

(58) Field of Classification Search

CPC ................. F21K 9/20; F21K 9/90; F21S 4/10

See application file for complete search history.

(56) References Cited

U.S. PATENT DOCUMENTS

| | | | | |
|---|---|---|---|---|
| 2010/0296290 A1* | 11/2010 | Yang | F21S 4/10 | 362/249.16 |
| 2011/0109242 A1* | 5/2011 | Wang | F21V 23/06 | 315/294 |
| 2011/0194292 A1* | 8/2011 | Tsai | F21V 31/04 | 362/231 |
| 2020/0386391 A1* | 12/2020 | He | H05B 45/40 | |

FOREIGN PATENT DOCUMENTS

CN 216769131 U * 6/2022

* cited by examiner

*Primary Examiner* — Keith G. Delahoussaye

(57) ABSTRACT

Disclosed is an LED lamp manufactured through an injection process. According to the LED lamp, a printed circuit board together with an LED luminous body electrically connected to the printed circuit board is accommodated in an injection body of the LED lamp, and each of a plurality of conducting wires insulated from one another in a first linear conductor is electrically connected to one corresponding terminal of the printed circuit board to realize power supply to and even control on the LED luminous body. In addition, through injection, the present disclosure may realize rapid, simple and convenient formation of a housing of the lamp for the linear conductor to penetrate.

6 Claims, 3 Drawing Sheets

LED LAMP MANUFACTURED THROUGH INJECTION PROCESS

CROSS-REFERENCE TO RELATED APPLICATION

This application claims priority from the Chinese patent application 2023101577481 filed Feb. 23, 2023, the content of which is incorporated herein in the entirety by reference.

TECHNICAL FIELD

The disclosure herein relates to the field of LED lamps, in particular to an LED lamp manufactured through an injection process.

BACKGROUND

The Chinese patent application document CN113932159A discloses an LED lamp. As an LED lamp manufactured through an injection process, a structure of the LED lamp disclosed by the patent application document is lower than that of a traditional injected LED lamp in terms of complexity; a printed circuit board, a resistor, etc. are eliminated; and: in a manufacturing process of this type of LED lamp, it is merely necessary to glue a hole shown in FIG. 1 for fixation. Compared to an extensive adhesive filling process in the prior art, the production duration of this type of LED lamp can be further shortened.

However, an LED luminous body (including an LED lamp bead chip and a possible driver chip, etc.) is generally small, and a matched solder pad is also small. When conducting wires are soldered, there is a technical problem that solder short circuits are prone to being caused. Furthermore, as the number of LED lamp beads in a lamp string increases, the matched wires for connection to the aforementioned LED lamp need to be thicker to enhance their load capacity. A new problem arises: as the wires become thicker, it becomes increasingly inconvenient to directly solder the LED luminous body onto these thicker wires, as disclosed in the technical solution of the Chinese patent application document CN113932159A.

In view of this, it is necessary to develop a new technology of manufacturing an LED lamp through an injection process so as to solve the above technical problem.

SUMMARY

In view of this, the present disclosure provides an LED lamp manufactured through an injection process, including:

a band-shaped LED lamp body and an injection body.

The band-shaped LED lamp body includes a first linear conductor, and one printed circuit board arranged on the linear conductor, wherein at least one LED luminous body is electrically connected to the printed circuit board;

the printed circuit board together with the LED luminous body electrically connected to the printed circuit board is capable of being accommodated in the injection body;

and, the first linear conductor includes a plurality of conducting wires insulated from one other, wherein each conducting wire is electrically connected to one corresponding terminal of the printed circuit board.

Preferably, a head part of the injection body has an arc-shaped light guide surface, and the following components are arranged below the head part in sequence:

M barbs, evenly distributed in a circumferential direction of the arc-shaped light guide surface and protruding outwards in a radial direction of the arc-shaped light guide surface;

N flexible protruding parts, configured to fix the LED lamp to a hole for the LED lamp to penetrate; and a blocking part, jointly configured to limit the LED lamp with the M barbs so as to prevent the LED lamp from penetrating through the hole.

Preferably, when the first linear conductor includes two conducting wires insulated from each other, one of the conducting wires is used as a live wire or is configured to supply power to a direct current anode, and the other conducting wire is used as a neutral wire or is configured to supply power to a direct current cathode.

Preferably, the two conducting wires insulated from each other are further configured to transmit a signal so as to control a working state of the LED luminous body.

Preferably, the first linear conductor penetrates into and out of the injection body through at least one hole in the injection body.

Preferably, the injection body further forms the M barbs, the N flexible protruding parts and the blocking part through a manner of injection.

Preferably, the flexible protruding parts are flexible protruding strips.

Preferably, outer contours of the N flexible protruding strips constitute a circle with a diameter of D, and the diameter D is slightly larger than a diameter of the hole for the LED lamp to penetrate.

Preferably, a maximum outer diameter of the M barbs is larger than the diameter of the hole for the LED lamp to penetrate.

Preferably, the blocking part is a circular baffle, and a diameter of the circular baffle is larger than the diameter of the hole for the LED lamp to penetrate and larger than the diameter D.

In conclusion, the present disclosure significantly solves the problem that a short circuit is prone to being caused in the case of connection of the conducting wires and the LED luminous body (for example, soldering), and the problem that it is increasingly inconvenient to directly connect the conducting wires and the LED luminous body due to increasingly large diameters of the conducting wires. Compared to the prior art, according to the present disclosure, the printed circuit board together with the LED luminous body electrically connected to the printed circuit board is accommodated in the injection body of the LED lamp, and each of the plurality of conducting wires insulated from one another in the first linear conductor is electrically connected to the corresponding terminal of the printed circuit board to realize power supply to and even control of the LED luminous body. In addition, through injection, the present disclosure may realize rapid, simple and convenient formation of a housing of the lamp for the linear conductor to penetrate. Therefore, a structure of the LED lamp disclosed by the present disclosure and a process thereof are more effective in lowering a short circuit failure between the conducting wires matched with the LED lamp and the LED luminous body, and can better face the challenges brought by conducting wires of increasingly large diameters to a production process, so that production efficiency can be comprehensively increased, a production cost can be lowered and a failure rate can be reduced.

BRIEF DESCRIPTION OF FIGURES

In order to provide a clearer description of the technical solutions in the embodiments of the present disclosure, a brief introduction will be provided below regarding the accompanying drawings used in the embodiments. It should be understood that the following accompanying drawings are merely illustrative of certain embodiments of the present disclosure and should not be considered as limiting the scope thereof. Those skilled in the art will appreciate that, without exercising inventive effort, other relevant accompanying drawings can be obtained based on these accompanying drawings.

Figure 1:
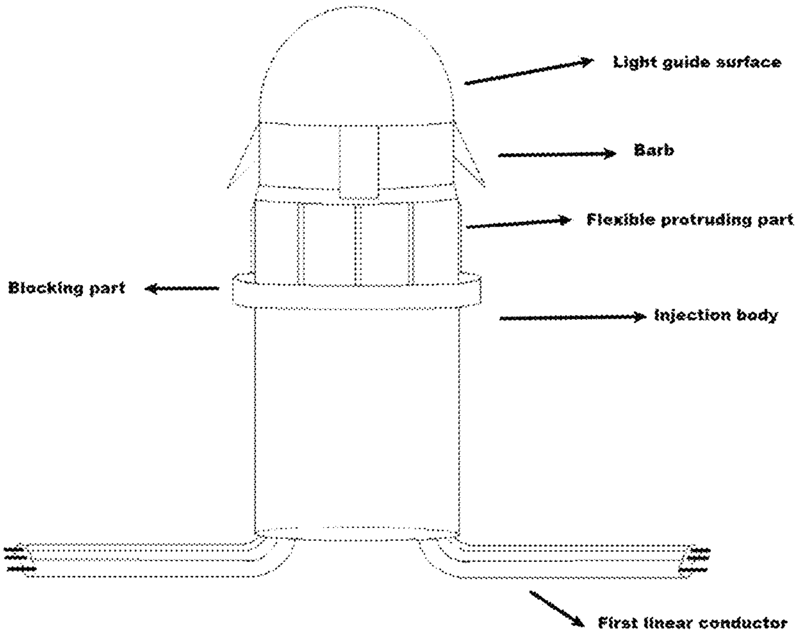
FIG. 1 is a schematic structural diagram of an LED lamp manufactured through an injection process provided by an embodiment of the present disclosure.

Reference numerals: 121—bracket; 122—first substrate; 123—second substrate; 124—first cup; 125—second cup; 126—light transmitting layer; 127—current limiting IC; 128—LED lamp bead chip.

It should be noted that the above accompanying drawings do not limit the dimensional ratios of lines, LED luminous bodies, various ICs and other parts to each other. The accompanying drawings are more illustrative of the structure, connection relationships, spatial position relationships, etc.

DETAILED DESCRIPTION

In order to make objectives, technical solutions and advantages of embodiments of the present disclosure clearer, the technical solutions in the embodiments of the present disclosure will be described clearly and comprehensively in conjunction with FIG. 1 to FIG. 5 in the embodiments of the present disclosure. It is evident that the described embodiments are only a part of the embodiments of the present disclosure, rather than all the embodiments. Components of the embodiments of the present disclosure described and illustrated in the accompanying drawings can be arranged and designed in various configurations.

Therefore, the detailed description provided below with respect to the embodiments of the present disclosure shown in the accompanying drawings is not intended to limit the scope of the claimed invention. It is solely representative of selected embodiments of the present disclosure. All other embodiments obtained by those skilled in the art without exercising inventive effort based on the embodiments disclosed herein are also within the scope of protection of the present disclosure.

It should be noted that: similar reference numerals and letters represent similar elements in the accompanying drawings below. Accordingly, once an item is defined in one drawing, further definition and explanation thereof are not necessary in subsequent accompanying drawings.

It should be noted in the description of the present disclosure that the terms "up", "down", "inside", "outside", and other directional or positional relationships are based on the orientation or position shown in the accompanying drawings, or the customary orientation or position when using the product of the present disclosure. These terms are used for facilitating description and simplifying the description, and do not indicate or imply that the device or component referred to must have a specific orientation, constructed and operated in a specific orientation. Therefore, they should not be understood as limiting the present disclosure.

In addition, the terms "first", "second", etc. are used only for purposes of distinguishing between descriptions, and should not be understood as indicating or implying relative importance.

It should be noted that, unless conflicting, features in the embodiments of the present disclosure may be combined with each other.

In one embodiment, the present disclosure provides an LED lamp manufactured through an injection process, including:

a band-shaped LED lamp body and an injection body.

The band-shaped LED lamp body includes a first linear conductor, and one printed circuit board arranged on the linear conductor, wherein at least one LED luminous body is electrically connected to the printed circuit board;

the printed circuit board together with the LED luminous body electrically connected to the printed circuit board is capable of being accommodated in the injection body;

and, the first linear conductor includes a plurality of conducting wires insulated from one other, wherein each conducting wire is electrically connected to one corresponding terminal of the printed circuit board.

With reference to FIG. 1, FIG. 2, FIG. 3A and FIG. 3B, it can be seen that compared to the prior art, in this embodiment, the printed circuit board together with the LED luminous body electrically connected to the printed circuit board is accommodated in the injection body of the LED lamp. For example, the first linear conductor, the printed circuit board electrically connected to the first linear conductor and the LED luminous body thereon are bent and inserted into the hole of the injection body.

In addition, preferably, in a status where no conducting wire is cut off, each of the plurality of conducting wires insulated from each other in the first linear conductor is electrically connected to the corresponding terminal in the printed circuit board to realize power supply to and even control of the LED luminous body. In addition, through injection, the present embodiment may realize rapid, simple and convenient formation of a housing of the lamp for the linear conductor to penetrate. Therefore, a structure of the LED lamp disclosed by this embodiment and a process thereof are more effective in lowering a short circuit failure between the conducting wires matched with the LED lamp and the LED luminous body, and can better face the challenges brought by conducting wires of increasingly large diameters to a production process, so that production efficiency can be comprehensively increased, a production cost can be lowered and a failure rate can be reduced.

Further, in one embodiment, as the conducting wires in the linear conductor become larger in diameters, and a corresponding larger printed circuit board is arranged, preferably, the conducting wires are cut off or cut short, and then the cut conducting wires are soldered on two sides of the printed circuit board.

Further, in one embodiment, the plurality of conducting wires insulated from one another in the linear conductor are arranged in parallel to form a plane, so that the linear conductor remains nearly unchanged in a thickness direction but becomes wider in a horizontal direction; or the plurality of conducting wires are bound into a bunch so that the linear conductor becomes larger in diameter and is presented as a cable.

Further, in one embodiment, for the first linear conductor, all the terminals of the printed circuit board are in one-to-one correspondence to the plurality of conducting wires insulated from one another in the first linear conductor.

It should be noted that, with regard to each of the plurality of conducting wires insulated from one another in the first linear conductor, each conducting wire is electrically connected to one corresponding terminal of the printed circuit board to realize power supply to and even control of the LED luminous body. On the one hand, this means that in a production process, it is merely necessary to cut a part of insulated leather of the conducting wire to realize connection with the printed circuit board, instead of cutting off an entire conducting wire; and on the other hand, this facilitates forward or backward cascading of the LED lamp. Reference may be made to subsequent description for details about cascading.

In addition, it should be further noted that all conducting wires forcibly cannot be cut off.

Further, in one embodiment, the LED lamp further includes a second linear conductor, the second linear conductor includes a plurality of conducting wires insulated from one another, and each conducting wire is electrically connected to one corresponding terminal of the printed circuit board; and the first linear conductor and the second linear conductor jointly realize that all the terminals of the printed circuit are in one-to-one correspondence to the plurality of conducting wires insulated from one another of both linear conductors.

In one embodiment, the first linear conductor adopts an outdoor rubber wire, so the problem of aging may be effectively avoided in a using process and a service life thereof is prolonged. Of course, a material of the first linear conductor is not limited to that, and the linear conductor may also be other flexible linear materials, such as PVC. More preferably, the first linear conductor adopts a waterproof and high voltage-proof outdoor rubber linear material.

In one embodiment, more specifically, as shown in FIG. 1:

a head part of the injection body has an arc-shaped light guide surface, and the following components are arranged below the head part in sequence:

barbs, in the quantity of M, where M is an integer. Typically, M is larger than or equal to 2. For example, the injection body of the LED lamp in FIG. 1 has four barbs which are evenly distributed along a 90° angle, one of the barbs is not illustrated (located on the back side). It can be seen that the barbs are evenly distributed in a circumferential direction of the arc-shaped light guide surface and protruding outwards in a radial direction of the arc-shaped light guide surface;

flexible protruding parts, in the quantity of N, where if FIG. 1 is considered as even distribution, it may be considered that there are eight flexible protruding parts, four of which are not illustrated (located on the back side). It can be seen that the flexible protruding parts are configured to fix the LED lamp to a hole for the LED lamp to penetrate; and a blocking part, jointly configured to limit the LED lamp with the M barbs so as to prevent the LED lamp from penetrating through the hole. It can be understood that if the hole is formed in a plate, a thickness of the plate is a depth of the hole. When the LED lamp is fixed on the hole in the plate in a penetrating mode, the M barbs and the blocking part are located on two sides of the plate respectively, so that the LED lamp is limited at the hole rather than being fixed on the hole, while the flexible protruding parts are configured to make direct contact with an inner wall of the hole so as to fix the LED lamp.

In one embodiment, when the first linear conductor includes two conducting wires insulated from each other, one of the conducting wires is used as a live wire or is configured to supply power to a direct current anode, and the other conducting wire is used as a neutral wire or is configured to supply power to a direct current cathode.

Figure 2:
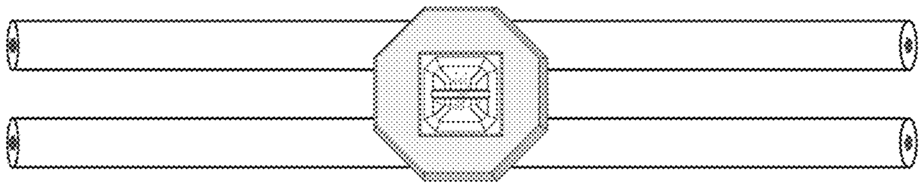
FIG. 2 is a schematic structural diagram of a printed circuit board and a first linear conductor when the first linear conductor includes two conducting wires insulated from each other in an LED lamp provided by an embodiment of the present disclosure.

For the above embodiment, as shown in FIG. 2, the printed circuit board is electrically connected to the first linear conductor composed of the two conducting wires insulated from each other.

In one embodiment, the two conducting wires insulated from each other are further configured to transmit a signal so as to control a working state of the LED luminous body.

It can be understood that the two conducting wires may transmit the signal through a carrier wave, that is, transmission of the signal does not require an extra conducting wire.

In one embodiment, as shown in FIG. 1, the first linear conductor penetrates into and out of the injection body through at least one hole in the injection body.

As shown in FIG. 1, the injection body has at least one hole in a lower part. Observed from left to right, the first linear conductor not only penetrates into the hole from a left side, but also further penetrates out of the hole from a right side. It can be understood that after penetrating out, the first linear conductor may be further connected to another printed circuit board and an LED luminous body thereon, so that the other printed circuit board and the LED luminous body thereon are jointly accommodated in another injection body. In this way, the LED lamp may substantially be extended and cascaded forward and backward continuously to form a lamp string. A plurality of the same LED lamps are distributed in sequence on the lamp string, but the plurality of LED lamps are all connected to the same first linear conductor.

It can be seen that, as shown in FIG. 1, a penetrating-in part of the first linear conductor is roughly parallel to a penetrating-out part of the first linear conductor.

Further, in one embodiment, when the first linear conductor penetrates into and out of the injection body:

the penetrating-in part of the first linear conductor and the penetrating-out part of the first linear conductor extend roughly in the same direction, or are roughly perpendicular to each other in different directions.

In conjunction with FIG. 1, it can be understood that, a relative location relationship between the penetrating-in part of the first linear conductor and the penetrating-out part of the first linear conductor is related to a design of the hole of the injection body.

In one embodiment, the flexible protruding parts are flexible protruding strips.

It should be noted that FIG. 1 illustrates the flexible protruding strips as the flexible protruding parts.

In one embodiment, as shown in FIG. 1:

outer contours of the N flexible protruding strips constitute a circle with a diameter of D, and the diameter D is slightly larger than a diameter of the hole for the LED lamp to penetrate;

a maximum outer diameter of the M barbs is larger than the diameter of the hole for the LED lamp to penetrate; and the blocking part is a circular baffle, and a diameter of the circular baffle is larger than the diameter of the hole for the LED lamp to penetrate and larger than the diameter D.

It should be noted that, for the purpose of the embodiment shown in FIG. 1, the light guide surface may also be prepared by an injection process. Further, in an injection process of the injection body, for the purpose of FIG. 1, from top to bottom, the light guide surface, the barbs, the flexible protruding parts, the blocking part, and the hole for the linear conductor to penetrate may all be formed through one-time injection, which further saves procedures. The first linear conductor may penetrate into the hole in a bottom of the injection body in FIG. 1 and, by a proper manner, make the printed circuit board and the LED luminous body thereon be located in a region corresponding to the light guide surface on the inside, for example: an internal structure configured to fix the LED luminous body or a gluing manner. When a gluing process is selected, the first linear conductor and the printed circuit board and the LED luminous body thereon penetrate the hole in the bottom of the injection body and then are glued in the hole for fixation. It is evident that gluing merely a location of the hole is much simpler than an extensive adhesive filling process in the prior art. It can be understood that if the LED lamp is merely used indoors, gluing is not needed; and instead, fixation by a rubber plug is enough. Or, structural design may be performed on the inside of the injection body, or other structures configured to fix the LED luminous body may be selected.

With reference to FIG. 1, what is not illustrated is that: a bottom section of the light guide surface is circular. The maximum outer diameter of the M barbs refers to a diameter of a circle which is concentric to a circle of the bottom section of the light guide surface and which locates two end points of outermost sides of two barbs that have the largest distance among the plurality of barbs distributed on a lower position of the light guide surface.

Figure 3A:
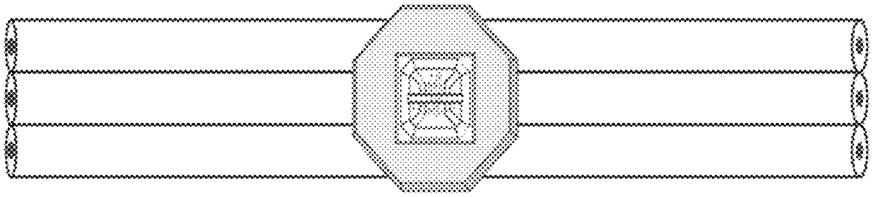
FIG. 3A and FIG. 3B are a schematic structural diagram of a front side and a schematic structural diagram of a back side of a printed circuit board and a first linear conductor when the first linear conductor includes two conducting wires insulated from each other in an LED lamp provided by an embodiment of the present disclosure.
Figure 3B:
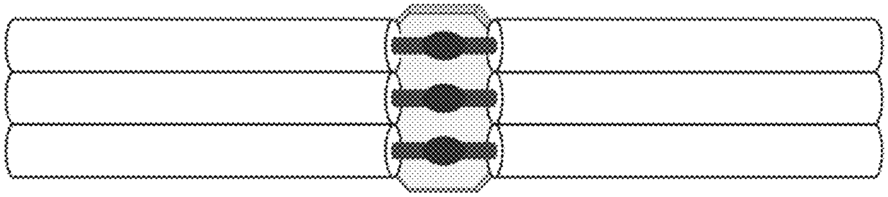

With further reference to FIG. 3A and FIG. 3B, one embodiment discloses that:

when the first linear conductor includes three conducting wires insulated from one another, a first conducting wire is used as a live wire or is configured to supply power to a direct current anode;

a second conducting wire is used as a neutral wire or is configured to supply power to a direct current cathode; and a third conducting wire is further configured to transmit a signal to control the working state of the LED luminous body.

It should be noted that, when the first linear conductor includes two or three conducting wires insulated from one another and the conducting wires are electrically connected to a plurality of the LED lamps, the two or three conducting wires may provide an electrical connection in a bus mode. In addition, the first linear conductor may further include more than three conducting wires insulated from one another. When the first linear conductor may further include more than three conducting wires insulated from one another, for example, when four conducting wires are adopted and the conducting wires are electrically connected to the plurality of the LED lamps, at least one conducting wire provides a breakpoint resume function. For example: four conducting wires may be adopted for a high-voltage lamp with signal transmission. The examples are not exclusive, and in conjunction with the first linear conductor and the second linear conductor mentioned before, a part of the four conducting wires belongs to the first linear conductor and the remaining conducting wires belong to the second linear conductor. For example, the first linear conductor is for power supply and the second linear conductor is for controlling, which realizes partial substitution or maintenance of the linear conductors rather than replacement of all linear conductors in a maintenance process of the LED lamp and the linear conductors. In addition, a bus type conduction or breakpoint resume belongs to the prior art and the present disclosure is not limited to that.

In one embodiment, a dimension of the printed circuit board in one direction, for example, a height of the printed circuit board as shown in FIG. 2, FIG. 3A and FIG. 3B is at least slightly larger than a total diameter of the conducting wires insulated from one another in the first linear conductor. This is designed for a special purpose: to solder the printed circuit board to the first conducting wire and the second conducting wire which are larger in diameter. For example, in a production process of the LED lamp, a chip related to the LED lamp is soldered on the printed circuit board; and a solder pad of the printed circuit board is enlarged and widened, which facilitates further soldering of the printed circuit board to the conducting wires with larger diameters.

In one embodiment, as shown in FIG. 1, the printed circuit board is a regular octagon or in a shape similar to a regular octagon.

It can be understood that a size of the printed circuit board and a wiring arrangement thereon may be flexibly set according to product needs. In addition, the LED lamp bead chip itself or an integrated LED luminous body may be directly soldered on the printed circuit board.

In one embodiment, on the printed circuit board, a gold wire, a silver wire, an alloy wire or FPC is adopted to electrically connect the printed circuit board and an LED related chip.

In one embodiment, the printed circuit board is electrically connected to at least a first chip and a second chip, wherein the first chip is the LED lamp bead chip; and in addition to the LED lamp bead chip, the chips electrically connected to the printed circuit board includes the second chip: a constant current chip.

It can be understood that constant current driving is the current main driving method for driving of LED chips. Therefore, for the present disclosure, it is preferred to use the constant current chip. Moreover, when selecting a constant current chip with small currents, the present disclosure also facilitates the realization of high-voltage, micro-current, and low-power supply to the LED chip, which is of special significance. This allows the LED lamp to be connected to more LED luminous bodies through a parallel connection. This is because: when parallel cascading is selected for forward and backward cascading, each LED luminous body has the same voltage, and by controlling the current and power of each LED luminous body through the constant current chip, the present disclosure may achieve more accurate current control than the prior art where a series high voltage scheme is adopted. In other words, the present disclosure may achieve a better solution for manufacturing LED lamps through an injection molding process with high voltage, low power, and precise control. Additionally, this helps to achieve longer parallel LED products; and especially in the case of extremely small current, as long as an LED can still satisfy the desired visual brightness, because the small current makes the power of each branch relatively low, under the premise of constant total power, each parallel branch may have equal voltage, which enables the realization of longer parallel LED products.

In addition, when a parallel second LED luminous body is included, this is of special significance because: when the plurality of LED luminous bodies are sequentially connected in parallel, any one of the LED luminous bodies may be cut freely to adopt to different needs for length in different scenarios. Even if a certain LED luminous body fails, the failing LED luminous body may be cut freely and direct connection to previous and latter conducting wires may be achieved, which facilitates maintenance.

In one embodiment, the LED luminous body further includes a third chip, and the third chip is configured to process a data signal of the LED chip.

It can be understood that the third chip may be independent of the second chip, or with continuous development of technology, the second chip and the third chip may be integrated into one chip.

In one embodiment, the LED lamp includes a plurality of LED luminous bodies in parallel or series connection.

In other words, other than the typical parallel high-voltage scheme, a series connection scheme may also be adopted. In the case of a parallel scheme, a plurality of LED chips may be in series connection inside each LED luminous body, which is for precisely controlling a current of the LED luminous body while separating voltage. Of course, the LED luminous bodies in series connection have their unique advantage. For example, if a current requirement is lowered, it is conducive to increasing the quantity of LED lamp bodies.

In fact, the present disclosure prefers an embodiment of parallel connection of a plurality of LED luminous bodies. When connected in parallel, each LED luminous body may be freely cut, and after cutting, each LED luminous body may meet the voltage requirements when connected to a power source. Otherwise, even if the LED luminous bodies are longer or more LED luminous bodies are connected in parallel, they will not meet the voltage requirements and each parallel branch of the LED luminous bodies will be directly burnt out. For example, in a scenario of using 110 V-230 V AC power supply, each LED luminous body itself includes dozens of LED chips connected in series or in series-parallel to withstand an AC voltage of 110 V or 230 V. Even if the LED lamp manufactured through the injection process according to the present disclosure includes three LED luminous bodies, when any one LED luminous body is cut off, as long as electrode conducting wires on two sides of the LED luminous body are preserved and connected to the 110 V or 230 V AC voltage, a circuit may be formed to emit light, as long as the LED luminous body itself does not have any faults. In contrast, the serially connected LED luminous bodies obviously cannot achieve this because the plurality of serially connected LED luminous bodies may only work under 110 V or 230 V voltage as a whole. If one of the LED luminous bodies is directly cut and connected to 110 V or 230 V voltage, it will probably be burnt out. It can be understood that the present disclosure is not limited to voltage standards such as 110 V and 230 V and may adopt other power supply voltage standards or a wider voltage range.

Because of this, in the case of parallel connection, each LED luminous body of the LED lamp may be cut freely, and after cutting, each LED luminous body may satisfy the requirement for power supply voltages when connected to a power source. In addition, in the case of LED luminous body failure, the failed LED luminous body may be cut off freely and the previous forward and backward segments may be connected; and in a case of no large loss in length, the LED lamp may further work under the same power supply voltage and can maintain the consistency of a visual effect of lighting, namely brightness.

In one embodiment, the LED luminous body is a paster type, which is more conducive to improving a manufacturing efficiency and ensuring properties of a product.

In one embodiment, the LED luminous body is a high voltage type, which is conducive to the manufacturing of parallel high-voltage products.

Figure 4:
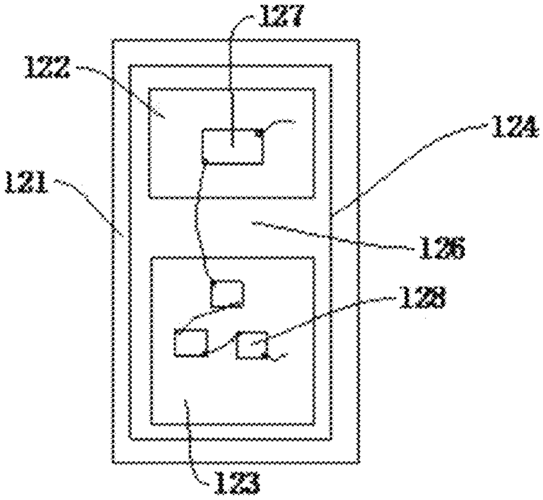
FIG. 4 is a schematic structural diagram of an LED luminous body provided by an embodiment of the present disclosure in a first angle of view.

In one embodiment, with reference to FIG. 4, an LED chip 128 is arranged in the LED luminous body 120, and the LED luminous body 120 emits light through the LED chip 128. The LED chip 128 is a high-voltage chip, so that even if all LED luminous bodies 120 are connected in parallel with one another, a high-voltage strip-shaped lamp may also be formed. During use, there is no need to use a converter to convert municipal power supply into a low voltage below a safe voltage, and a power supply demand may also be satisfied. Further, a problem that energy consumption is increased due to a low conversion efficiency in a conversion process is avoided. It should be noted that the high-voltage chip is a structure in the prior art.

Further, there may be a plurality of LED chips 128, and the plurality of LED chips 128 are in series connection with one another, so that a required voltage of a single LED luminous body 120 meets a requirement. Exemplarily, the quantity of the LED chips 128 is three, and the three LED chips are in series connection with one another; and in this way, the voltage is a sum of voltages of the three LED chips 128. It may be understood that, in other embodiments, the quantity of the LED chips 128 may also be set according to a required voltage of the LED luminous body 120, for example, the quantity of the LED chips 128 is set to be one, two or four.

Further, the LED luminous body 120 further includes a current limiting IC 127, the current limiting IC 127 is in series connection with the LED chip 128, and by setting the current limiting IC 127, it is ensured that currents output by the LED luminous bodies 120 are consistent. At the same time, when a head and tail voltage of a module 100 of the LED lamp are within a range of a working voltage of the current limiting IC 127, it may be ensured that the LED luminous bodies 120 at the head and tail of the module 100 of the LED lamp are consistent in brightness. Preferably, the current limiting IC is a constant current chip.

Specifically, the LED luminous body 120 includes a bracket 121, and a first substrate 122 and a second substrate 123 arranged on the bracket 121, the current limiting IC 127 is arranged on the first substrate 122, and all the LED chips 128 are arranged on the second substrate 123.

Figure 5:
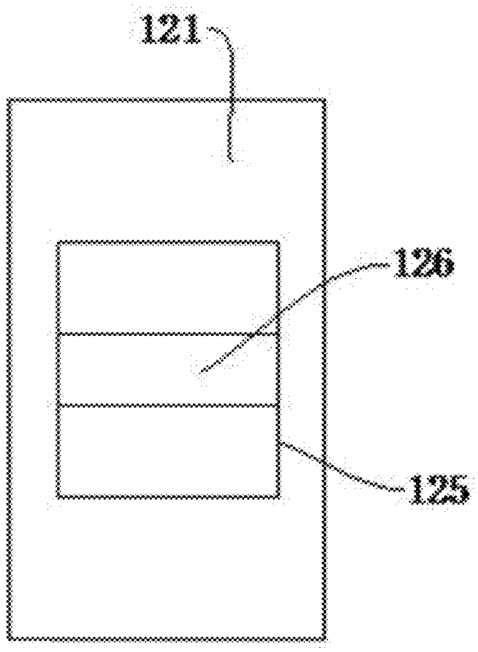
FIG. 5 is a schematic structural diagram of an LED luminous body provided by an embodiment of the present disclosure in a second angle of view.

In one embodiment,

FIG. 5 is a schematic structural diagram of the LED luminous body 120 in the LED lamp provided by the embodiment in FIG. 4 under a second angle of view. Specifically, FIG. 4 illustrates a front-side structure of the LED luminous body 120, and FIG. 5 illustrates a back-side structure of the LED luminous body 120. With reference to FIG. 4 to FIG. 5, it can be understood that the LED luminous body 120 is a luminous body which is luminous on two sides, and such a luminous body has a larger luminous range and a better using effect.

Specifically, the bracket 121 of the LED luminous body 120 has a first cup 124 and a second cup 125 arranged back to back, and a light transmitting layer 126 is arranged between the first cup 124 and the second cup 125. In this way, light emitted from inside the first cup 124 may penetrate the light transmitting layer 126 to emit from the second cup 125, or light emitted from inside of the second cup 125 may penetrate the light transmitting layer 126 to emit from the first cup 124.

Optionally, a part of the first substrate 122 and a part of the second substrate 123 respectively form a part of bottom wall of the first cup 124, the LED chip 128 is arranged in the first cup 124 and is fixed to the second substrate 123 through soldering, and at the same time, the current limiting IC 127 is arranged in the first cup 124 and is fixed to the first substrate 122 through soldering. The light transmitting layer 126 is arranged between the first substrate 122 and the second substrate 123, that is, light emitted by the LED chip 128 inside the first cup 124 penetrates through the light transmitting layer 126, enters the second cup 125, and is emitted outwards, thus realizing an effect of light emission on both sides. Specifically, the light transmission layer 126 is made of a transparent material.

A diffusion layer is arranged in the second cup 125, and the diffusion layer is made of a diffusion material. When the light entering the second cup 125 from the first cup 124 is emitted outwards, the light is diffused through the diffusion material in the diffusion layer, so that a light emitting effect on the back side of the LED luminous body 120 is roughly the same as a light emitting effect on the front side, and a light emitting effect of the LED luminous body 120 is improved.

The above description is only specific embodiments of the present disclosure and the scope of protection of the present disclosure is not limited thereto. Any changes or substitutions that can be easily conceived by those skilled in the art within the technological scope disclosed in the present disclosure should be encompassed within the scope of protection of the present disclosure. Therefore, the scope of protection of the present disclosure should be determined by the scope defined in the claims.

What is claimed is:

1. An LED lamp manufactured through an injection process, comprising:

a band-shaped LED lamp body and an injection body; wherein the band-shaped LED lamp body comprises a first linear conductor, and one printed circuit board arranged on the linear conductor, wherein at least one LED luminous body is electrically connected to the printed circuit board;

the printed circuit board together with the LED luminous body electrically connected to the printed circuit board is capable of being accommodated in the injection body; and, the first linear conductor comprises a plurality of conducting wires insulated from one other, wherein each conducting wire is electrically connected to one corresponding terminal of the printed circuit board;

a head part of the injection body has an arc-shaped light guide surface, a bottom section of the light guide surface being circular, and the following components are arranged below the head part in sequence:

M barbs, evenly distributed in a circumferential direction of the arc-shaped light guide surface and protruding outwards in a radial direction of the arc-shaped light guide surface and forming a downward wedge-shaped arm;

N flexible protruding parts, configured to fix the LED lamp to a hole for the LED lamp to penetrate; and a blocking part, jointly configured to limit the LED lamp with the M barbs so as to prevent the LED lamp from penetrating through the hole; if the hole is formed in a plate, a thickness of the plate is a depth of the hole; when the LED lamp is fixed on the hole in the plate in a penetrating mode, the M barbs and the blocking part are located on two sides of the plate respectively, so that the LED lamp is limited at the hole rather than being fixed on the hole, while the flexible protruding parts are configured to make direct contact with an inner wall of the hole so as to fix the LED lamp;

the light guide surface, the M barbs, the N flexible protruding parts, the blocking part, and the hole for the linear conductor to penetrate are formed through one-time injection;

the first linear conductor comprises three conducting wires insulated from one another;

a first conducting wire is used as a live wire or is configured to supply power to a direct current anode;

a second conducting wire is used as a neutral wire or is configured to supply power to a direct current cathode;

a third conducting wire is further configured to transmit a signal to control the working state of the LED luminous body;

the first linear conductor and the printed circuit board and the LED luminous body thereon penetrate the hole in the bottom of the injection body and then are glued in the hole for fixation;

a maximum outer diameter of the M barbs is larger than the diameter of the hole for the LED lamp to penetrate, wherein the maximum outer diameter of the M barbs is a diameter of a circle which is concentric to a circle of the bottom section of the light guide surface and which locates two end points of outermost sides of two barbs that have the largest distance among the plurality of barbs distributed on a lower position of the light guide surface;

the blocking part is a circular baffle, and a diameter of the circular baffle is larger than the diameter of the hole for the LED lamp to penetrate and larger than the diameter D;

the LED luminous body is directly soldered on the printed circuit board;

the first linear conductor comprises a plurality of conducting wires insulated from one other; and each conducting wire is electrically connected to one corresponding terminal of the printed circuit board; and the printed circuit board is electrically connected to at least a first chip and a second chip, wherein the first chip is the LED lamp bead chip and the second chip is a constant current chip.

2. The LED lamp according to claim 1, wherein the two conducting wires insulated from each other are further configured to transmit a signal so as to control a working state of the LED luminous body.

3. The LED lamp according to claim 1, wherein the first linear conductor penetrates into and out of the injection body through at least one hole in the injection body.

4. The LED lamp according to claim 1, wherein the injection body further forms the M barbs, the N flexible protruding parts and the blocking part through a manner of injection.

5. The LED lamp according to claim 4, wherein the flexible protruding parts are flexible protruding strips.

6. The LED lamp according to claim 5, wherein outer contours of the N flexible protruding strips constitute a circle with a diameter of D, and the diameter D is slightly larger than a diameter of the hole for the LED lamp to penetrate.

* * * * *